United States Patent
Adnan et al.

(10) Patent No.: US 7,152,685 B2
(45) Date of Patent: Dec. 26, 2006

(54) METHOD AND APPARATUS FOR DEPLOYING A LINE IN COILED TUBING

(75) Inventors: Sarmad Adnan, Sugar Land, TX (US); Michael G. Gay, Dickinson, TX (US)

(73) Assignee: Schlumberger Technology Corp., Sugar Land, TX (US)

( * ) Notice: Subject to any disclaimer, the term of this patent is extended or adjusted under 35 U.S.C. 154(b) by 0 days.

(21) Appl. No.: 10/872,176

(22) Filed: Jun. 18, 2004

(65) Prior Publication Data

US 2005/0279511 A1 Dec. 22, 2005

Related U.S. Application Data

(60) Provisional application No. 60/480,347, filed on Jun. 20, 2003.

(51) Int. Cl.
*E21B 19/22* (2006.01)

(52) U.S. Cl. ............ 166/380; 166/384; 166/77.2

(58) Field of Classification Search ........ 166/385, 166/384, 77.2, 77.1, 65.1, 380
See application file for complete search history.

(56) References Cited

U.S. PATENT DOCUMENTS

| | | | |
|---|---|---|---|
| 5,503,370 A | 4/1996 | Newman et al. | |
| 5,544,706 A | 8/1996 | Reed | 166/379 |
| 5,573,225 A | 11/1996 | Boyle et al. | |
| 5,599,004 A | 2/1997 | Newman et al. | |
| 5,699,996 A | 12/1997 | Boyle et al. | |
| 5,944,099 A | 8/1999 | Sas-Jaworsky | |
| 5,946,788 A * | 9/1999 | Griffioen et al. | 29/433 |
| 5,950,298 A * | 9/1999 | Griffioen et al. | 29/433 |
| 5,992,250 A * | 11/1999 | Kluth et al. | 73/866.5 |
| 6,041,872 A | 3/2000 | Holcomb | |
| 6,531,694 B1 | 3/2003 | Tubel et al. | |
| 2004/0104052 A1 | 6/2004 | Livingstone | |

FOREIGN PATENT DOCUMENTS

JP 2-47611 2/1990

* cited by examiner

*Primary Examiner*—William Neuder
*Assistant Examiner*—Nicole A Coy
(74) *Attorney, Agent, or Firm*—Tim Curington; Robin Nava; Dale Gaudier

(57) ABSTRACT

Methods and apparatus for deploying a line in a borehole using coiled tubing are presented. Methods are applicable for use in deploying a line in a coiled tubing when the coiled tubing is spooled on a reel or deployed in a wellbore. A line reel provided in a pressure housing is used to supply a line for deployment using fluid flow in coiled tubing. The line reel assembly and deployments methods are suitable for use under well pressure. The line may comprise fiber optics. Subsequent to deployment of coiled tubing with a line dispose therein, the coiled tubing may be withdrawn, leaving the line in the wellbore.

27 Claims, 5 Drawing Sheets

METHOD AND APPARATUS FOR DEPLOYING A LINE IN COILED TUBING

This patent application is a non-provisional of provisional application Ser. No. 60/480,347 filed Jun. 20, 2003.

BACKGROUND OF THE INVENTION

1. Field of the Invention

The present invention relates generally to installing a line in coiled tubing and more particularly to methods and apparatus for deploying fiber optics under pressure into a wellbore using coiled tubing.

2. Description of the Related Art

Coiled tubing is used frequently in various borehole applications. A typical configuration for the surface handling equipment for coiled tubing is shown generally in FIG. 1. The surface handling equipment includes an injector system 20 on injector supports 29 and coiled tubing reel assembly 10 on reel stand 12. The tubing is deployed into or pulled out of the well using an injector head 19. The equipment further includes a levelwind mechanism 13 for guiding coiled tubing 15 on and off the reel 10. The tubing 15 passes over tubing guide arch 18 which provides a bending radius for moving the tubing into a vertical orientation for injection through wellhead devices into the wellbore. The tubing passes from tubing guide arch 18 into the injector head 19 which grippingly engages the tubing and pushes it into the well. A stripper assembly 21 under the injector maintains a dynamic and static seal around the tubing to hold well pressure within the well as the tubing passes into the wellhead devices which are under well pressure. The tubing then moves through a blowout preventor (BOP) stack 23, a flow tee 25 and wellhead master valve or tree valve 27. A quick connect fitting is placed between the BOP and the stripper above.

It is routine to deploy coiled tubing into a wellbore under pressure. The following general procedure typically is used when running a coiled tubing string into a well. First the wellhead master valve 27 is closed to seal off the well and the BOP stack 23 is opened. Then the service end of the coiled tubing is run over the guide 18 and through the injector 19 and stripper 21, and a bottom hole assembly (BHA) is assembled onto the leading end of the tubing 15.

After the BHA is connected, the injector assembly is raised with the BHA extending from the bottom and lowered into the top of the BOP stack 23. Stripper 21 is bumped up on the stack and the quick union on the bottom of the stripper and top of the BOP stack 23 is made up. A pressure test is conducted with the wellhead tree closed and the coiled tubing open into the flow tee 25 at the bottom of the BOP stack 23 to pressure test surface treatment lines, wellhead connectors and flow control devices. The pressure on the coiled tubing system and control stacks is matched to the well pressure and the well is opened. The coiled tubing is then run into the well.

In some situations, it is desired to convey tools, sensors, or other apparatuses into a wellbore using coiled tubing. Coiled tubing is particularly useful for conveying such devices in highly deviated or horizontal wells. When the functionality of the tools, sensors, or other apparatus requires electrical communication the downhole device and the surface, it is known place a wireline cable within the coiled tubing.

Placing cable into coiled tubing typically involves unreeling the coiled tubing and installing the cable in the straightened tubing. One method involves unreeling the coiled tubing, hanging it in a wellbore, placing the cable inside the coiled tubing by gravity feed, and then reeling in the tubing with the cable inside. Another method involves unreeling the coiled tubing along on a long stretch of ground on the surface, attaching a pig to one end of the cable, and pumping fluid such as water into coiled tubing to propel the cable along the length of the coiled tubing as guided by the pig. It is apparent that the additional time and effort required to place cable in coiled tubing in these manners is operationally undesirable. Placing cable in the coiled tubing while the coiled tubing is spooled on the reel is preferable.

A few methods of pumping cable into coiled tubing while reeled are known. These methods generally involve injecting cable into the coiled tubing by pumping water or another fluid at sufficient flow into the reel of coiled tubing to propel the cable through the coiled tubing. Movement of the cable is resisted however by the pressure differential between the pressurized coiled tubing reel and outside ambient pressure at which the cable is provided, as well as friction forces at the interface where the cable enters the pressurized coiled tubing reel. In particular, the cable tension induced by the cable seal through which the cable must be passed into the tubing acts against movement of the cable into the borehole.

In general, mechanical means such as including a capstan with a pressure housing to direct the cable into the reel of coiled tubing as described in U.S. Pat. No. 5,599,004 have been used counteract the pressure forces resisting injection of the cable into the pressured coiled tubing. U.S. Pat. No. 5,599,004 discusses in passing the concept of placing an entire spool of cable inside a pressure chamber as an alternative configuration as this would eliminate the need for a seal. It discards the concept, however, noting problems with aligning cable with coiled tubing and controlling the cable insertion are expected, along with an unrealistically high cost for such a system. These impediments among others have prevented development of a pressured system for injection of cable into coiled tubing.

US 2004/0104052 describes methods for performing coiled tubing drilling using concentric outer and inner coiled tubings. In certain configurations, an electric wireline is provided inside the inner coiled tubing by using a second coiled tubing bulkhead.

U.S. Pat. Nos. 5,573,225 and 5,699,996, both incorporated herein in the entirety by reference, relate to an apparatus and methods for pumping cable into a coiled tubing using fluid and without using a mechanical device to pull the cable through the seal. These patents describe an apparatus and methods for passing a cable through a seal into a tube having a coupling in fluid communication with a fluid pump. Fluid is then pumped into the tubing at a rate sufficient to cause a drag force on the cable sufficient to equal or overcome the frictional force exerted on the cable by the seal and the differential pressure on the cable that would tend to force it back through the seal. The drag force causes the cable to move axially within the tube toward the end remote from the seal.

In placing wireline cable in coiled tubing, there are several advantages of a fluid flow system over a mechanical system that uses mechanical pulling or pushing to overcome cable tension. It is easier and less expensive as well as being safer and easier to control. The forces applied to the cable are low so the potential for damaging the cable during installation is less than when using a mechanical pulling device. In addition to installing cable in coiled tubing, fluid pumping techniques are also useful for removing cable from coiled tubing.

Several difficulties remain when providing wireline cable in coiled tubing. For example, managing slack in the wireline while it is interior to the coiled tubing poses operational difficulties. In addition, the presence of wireline in the coiled tubing reduces the available capacity for pumped fluids within the coiled tubing. Furthermore, the following process is known when using providing sensor or measurement apparatus by using wireline in coiled tubing: installing the wireline in the coiled tubing, attaching sensor or apparatus or wireline tools comprising the sensor or apparatus to the downhole end of the coiled tubing string, taking and recording measurements, and later analyzing the recorded information to improve or optimize the next coiled tubing operation. Coiled tubing operations would be improved if downhole measurement data were available in real time while the operations were ongoing. In this regard, fiber optics are known to be useful in providing measurement data in real time.

U.S. Pat. No. 6,531,964, incorporated herein in its entirety by reference, describes use of fiber optic sensors to make measurements of downhole conditions in a borehole. A method is presented for deploying fiber optic devices into a wellbore include pumping the devices under pressure using a fluid. Another method for deploying a production or completion string into a borehole is also provided, the string including a hydraulically operable device carried by a tubing. A fluid conduit is provided either outside or inside the string and a hydraulic connection is provided from the fluid conduit to the hydraulically operable device so that fluid under pressure can pass from the conduit to the device. After the string has been installed to the desired depth in the wellbore, then an optical fiber can be pumped into the conduit, the conduit having a U-shaped component to permit the leading end of the optical fiber to return to the surface. Disadvantages of this method include the need for providing a separate conduit for single optical fiber installation. Furthermore, the requirement of this configuration that a conduit is provided in the initial installation limits operational flexibility; this limitation is addressed by the present invention.

Thus, the prior art with respect to deploying cable into coiled tubing teaches methods to install cable into coiled tubing using mechanical means to overcome the pressure differential encountered when deploying coiled tubing into a borehole or using a combination of configured flow tubes and fluid flow to overcome the pressure differential. The prior art with respect to deploying optical fibers in a borehole teaches the need for fluid conduit into which the optical fiber is deployed and the pressured fluid pumped. There remains a need for a method and apparatus for deploying a line in coiled tubing that overcomes the resistance to insertion caused by the wellbore pressure and does not require a separate conduit. The present invention addresses shortcomings in the prior art. The issues that have affected the use and industry's ability to implement wireline in particular and lines in general in coiled tubing operations are addressed by the present methods and apparatus for deploying a line in coiled tubing.

SUMMARY OF THE INVENTION

The present invention provides methods and apparatus for deploying a line in coiled tubing that are suitable for use when the coiled tubing is spooled on a reel or deployed in a borehole and when under well pressure. A line reel assembly is provided wherein the line is disposed on a reel within a pressure housing. The line is deployed via a deployment tube that can be hermetically connected to the coiled tubing. When the deployment tube is connected to the coiled tubing before deployment, the line reel assembly is pressured as the coiled tubing is pressured upon injection into the wellbore. In this manner, the present invention avoids the friction forces and ejection pressures encountered when attempting to insert a cable at ambient pressure into coiled tubing at well pressure. The line is propelled through the deployment tube into the coiled tubing by fluid flow diverted to the deployment tube via an inlet port from the pumped fluid passing through the coiled tubing. In this way, the line is conveyed by fluid flow without mechanical efforts. This makes the present invention particularly applicable for providing a line that comprises fiber optics.

In one embodiment, the present invention provides a method of placing a line in coiled tubing comprising providing a line disposed on a reel in a pressure housing and deploying the line within the coiled tubing using fluid flow. Preferably, the step of deploying the line is performed while the coiled tubing is spooled on a reel or as the coiled tubing is deployed into a wellbore. It may be performed while the coiled tubing is performed under well pressure. Methods of the present invention are applicable when the line reel assembly is also under pressure. In some embodiments, the line comprises fiber optics.

In an embodiment, the present invention provides a method of placing a line in coiled tubing comprising providing a line spooled on a reel in a pressure housing, providing a control device operable to selectively permit or prevent the line from unspooling, and contacting the line with fluid flow. The control device may be operated to permit the line to unspool or to prevent the line from unspooling. The fluid flow may be used to deploy the line within the coiled tubing. The control device may be operable to prevent unspooling of the line reel such as a brake, or it may be operable to drive unspooling of the line reel such a motor.

In another embodiment, the present invention provides a method for placing a line into a wellbore comprising the steps of deploying coiled tubing into a wellbore, pumping a fluid into the coiled tubing, injecting a line into the coiled tubing, wherein the line is disposed on a reel provided in a pressure housing, and using the pumped fluid to convey the line along the coiled tubing. Additionally, the coiled tubing may be removed from the wellbore and pumping of fluid continued. In some embodiments, the fluid flow may be used to maintain the line in a downhole position in the wellbore while the coiled tubing is being removed. Thus, in some embodiments, the present invention provides a method for placing a line in a wellbore using coiled tubing as a conduit by which to convey the line into a downhole position. The line may comprise fiber optics such as a single mode fiber, multimode fiber, bare fiber, coated fiber, or fiber enclosed within a duct or small encasement or conduit. In some embodiments, multiple optical fibers, being the same or varied, may be deployed. In some embodiments, a measurement device or sensor may be provided on or with the line.

In another embodiment, the present invention provides methods for placing a line into a wellbore comprising deploying a line disposed in a pressure chamber into a coiled tubing and deploying the coiled tubing and line into a wellbore. These methods may be performed under well pressure, and may be performed while the coiled tubing and the line reel assembly are under well pressure.

The present invention provides an apparatus for deploying a line in a coiled tubing comprising a line reel disposed in a pressure housing, a line deployment tube, and fluid flow within the line deployment tube. The apparatus may further comprise a connector, the fluid flow in the line deployment tube being is in hydraulic communication with fluid flow in the coiled tubing. In some embodiments, the line reel is disposed on a shaft. A control device may be provided, the device being operable to selectively permit or prevent rotation of the line reel on the shaft. The control device may be operable to prevent unspooling of the line reel, such as a brake, or it may be operable to drive unspooling of the line reel, such a motor.

In some embodiments, the present invention provides a method for placing fiber optics into a wellbore comprising the steps of deploying coiled tubing into a wellbore, pumping a fluid into the coiled tubing, injecting a fiber optic line into the coiled tubing, wherein the fiber optic line is disposed on a reel provided in a pressure housing, and using the pumped fluid to convey the line along the coiled tubing. Methods may further comprise removing the coiled tubing from the wellbore. The fluid pumping may continue while removing the coiled tubing from the wellbore and the fiber optic line left in the wellbore.

Other features, aspects and advantages of the present invention will become apparent from the following discussion.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the claims.

DETAILED DESCRIPTION OF THE INVENTION

Figure 1:
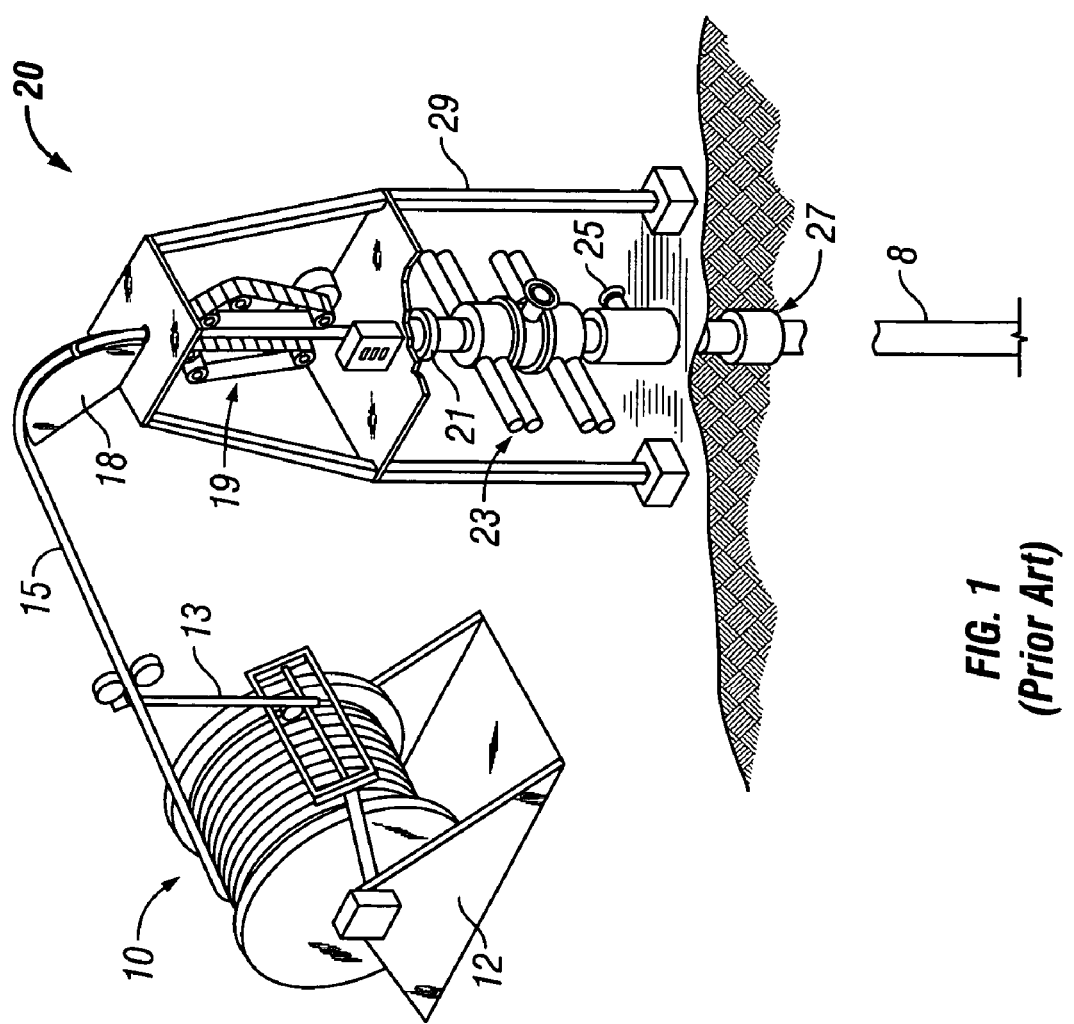
FIG. 1 shows a typical configuration for coiled tubing surface handling equipment.
Figure 2:
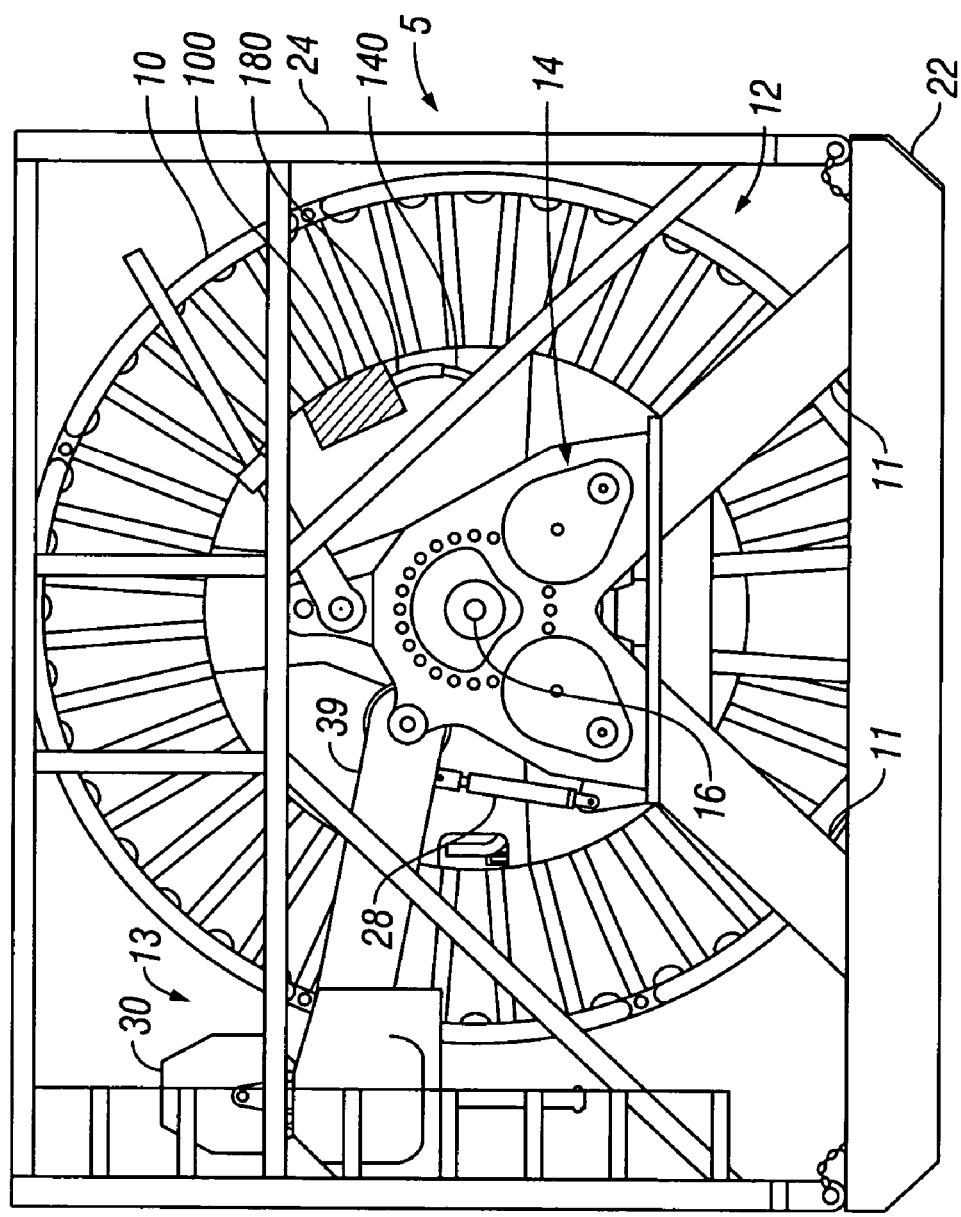
FIG. 2 shows an embodiment of the present invention wherein a line reel assembly is provided with a coiled tubing reel.

Referring to the drawings in detail, wherein like numerals denote identical elements throughout the several views, there is shown in FIG. 2 a coiled tubing reel assembly 5 shown generally as a coiled tubing reel 10 on a reel stand 12 placed on a skid 22. While the reel assembly is shown on a skid in FIG. 2, it similarly could be placed on a trailer, mounted on a truck, or provided in a variety of configurations for transport and use, to which the present invention is similarly applicable. The reel 10 is shown mounted on an axle 16 and supported by legs 11. Drive unit 14 is powered by one or more motors and is used provide rotational power to spool and unspool coiled tubing 15 on reel 10. When deploying coiled tubing 15 in a wellbore 8, the coiled tubing reel 10 is rotated by the drive unit 14 to unspool the coiled tubing 15 which fed from the reel 10 through the levelwind assembly to the injector system 20 for injection under pressure into the wellbore. A hydraulic connection (not shown) on the opposite side of the reel 10 may be provided for use in proving fluids, such as drilling or stimulation fluids, into the coiled tubing 15 prior to injecting the coiled tubing 15 into wellbore 8. In some applications, such as fracturing, these fluids may be provided at high pressures.

When retrieving coiled tubing 15 from a wellbore 8, the drive unit 14 is used to rotate the coiled tubing reel 10 in the opposite direction to spool the coiled tubing 15 back on the coiled tubing reel 10. Carriage 30, moveable along a track (not shown), may be used to guide the coiled tubing 15 evenly across the coiled tubing reel 10 as it is being spooled.

Also shown on FIG. 2 is line reel assembly 100 connected to coiled tubing end 140 by line deployment tube 180. Line reel assembly 100 is shown in FIG. 2 as mounted to the interior diameter of coiled tubing reel 10; in this manner, line reel assembly 100 rotates with coiled tubing reel 10 and line deployment tube 180 remains connected to coiled tubing end 140 and line reel assembly 10 as coiled tubing 15 is unspooled for deployment and spooled for retrieval. The present invention is not limited to the configuration where the line reel assembly 100 is mounted to the interior diameter of the coiled tubing reel 10 but is applicable in any configuration in which line deployment tube 180 remains connected to coiled tubing end 140 and line reel assembly 100 when coiled tubing reel 10 is static or rotating. For example, line reel assembly 100 may be provided on an axle and rotatably mounted on legs 11, or it may be mounted along the reel axle 16 and line reel assembly 100 permitted to rotate. Alternatively the line reel assembly may be mounted in a stationery position and a swivel connection used to permit line deployment tube 180 to move in association with movement of the coiled tubing end 140 while retaining connection with line reel assembly 100.

Figure 3A:
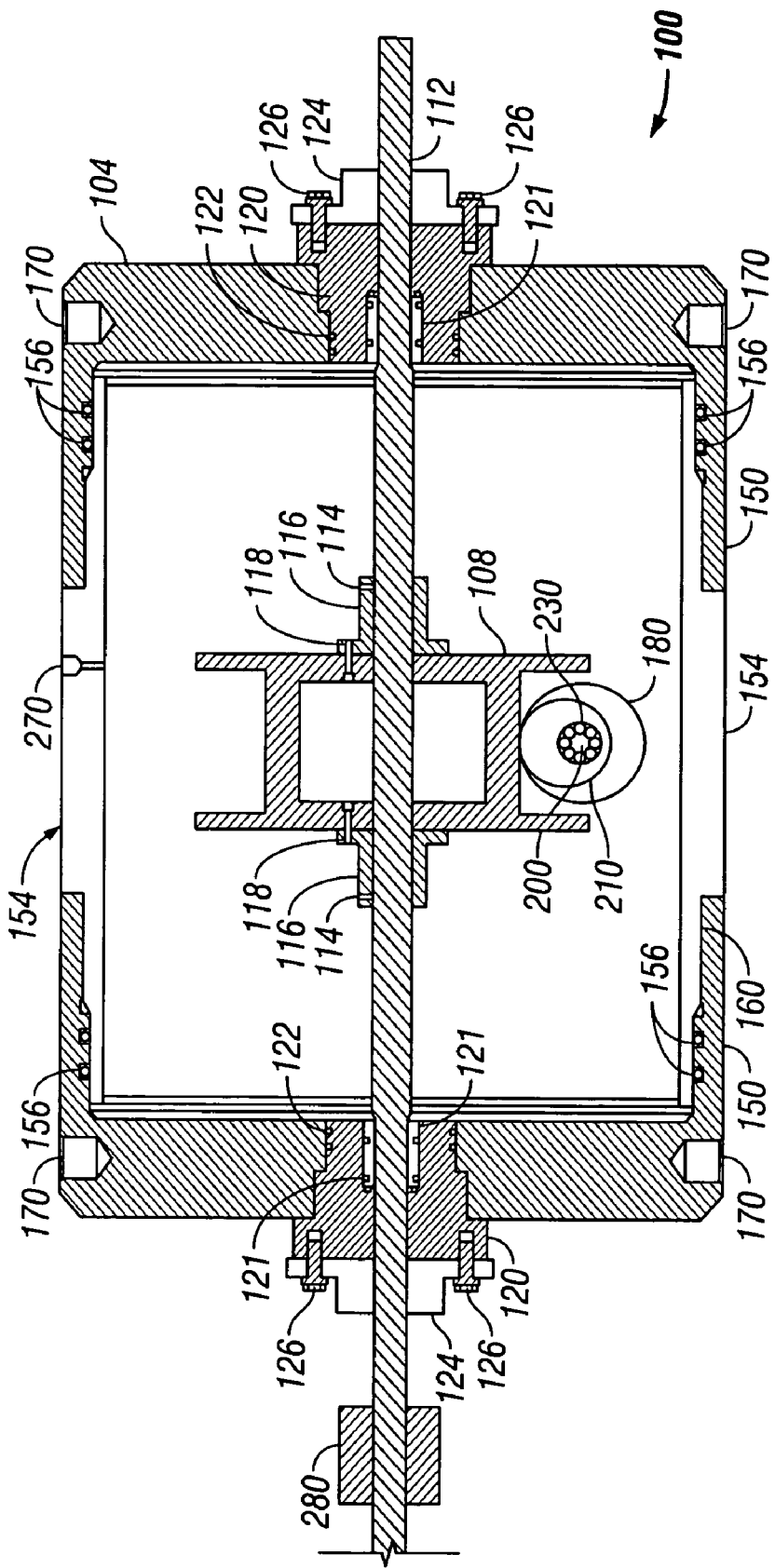
FIG. 3A shows a side view of an embodiment of the line reel assembly of the present invention.
Figure 3B:
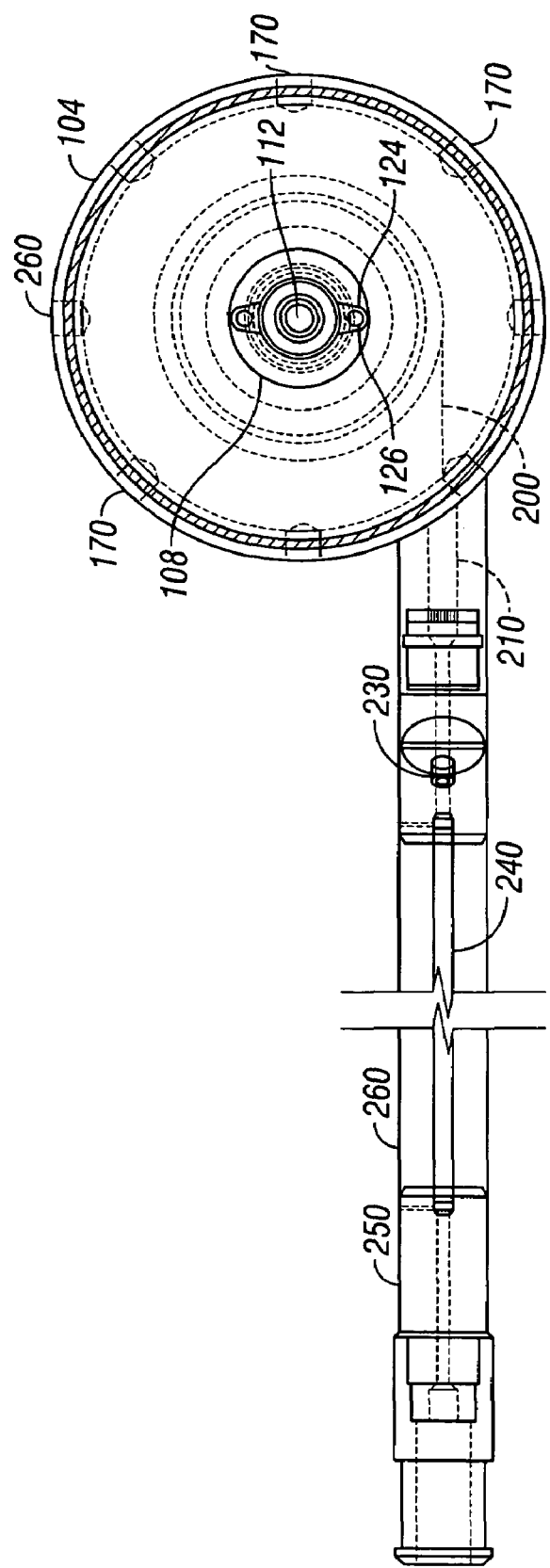
FIG. 3B shows an end view of an embodiment of the line reel assembly of the present invention.
Figure 3C:
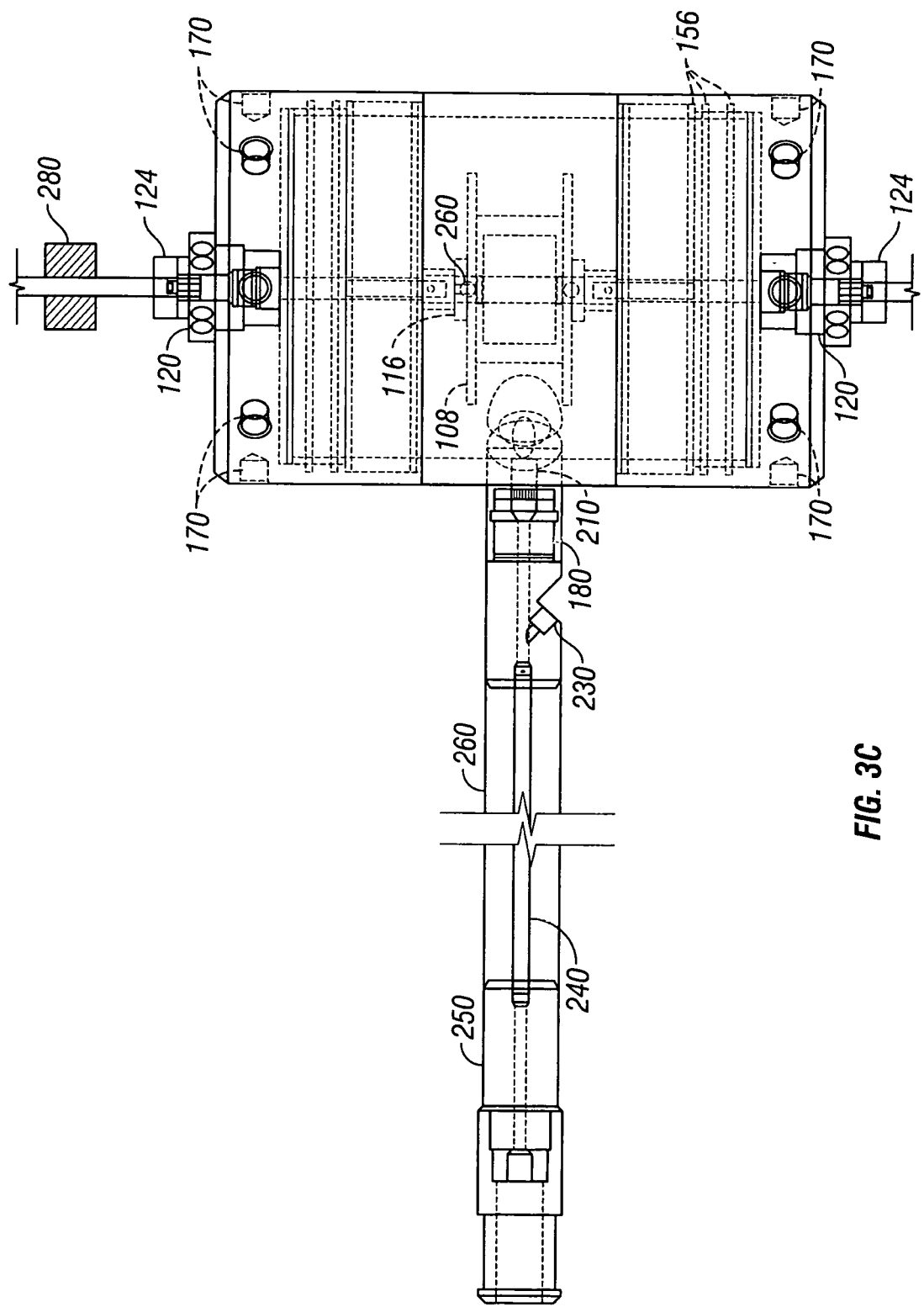
FIG. 3C shows a top view of an embodiment of the line reel assembly of the present invention.

Turning to FIGS. 3A–3C, an embodiment of line reel assembly 100 is shown. Line reel 108 is shown inside pressure housing 104. Line reel 108 is rotatably mounted on shaft 112 by bearings 116. Seal 114 is provided between bearing 116 and shaft 112 and bearing 116 is secured to line reel 108 using fastener 118 such as a pin.

Pressure bearings 120 are provided where shaft 112 penetrates pressure housing 104. Seals 121, 122 axe shown along the interior interface of pressure bearing 120 with shaft 112 and exterior interface of pressure bearing 120 with pressure housing 104. End caps 124 are placed atop pressure bearings 120 and secured by fasteners 126 shown in FIG. 3A as a screw. Tightening fasteners 126 compresses seals 121, 122, thereby providing higher pressure resistance along the interfaces of the pressure bearing with the shaft and end caps.

Pressure housing 104 is shown comprising body housing 154 and end pieces 150. Seals 156 are provided. In some embodiments, interface 160 between body housing 154 and end pieces 150 may be fingered, grooved, toothed, stair-stepped or similarly configured to provide an improved connection along interface 160. Fasteners 170, shown in FIG. 3A as lugs, when tightened are used to move end pieces 150 toward body housing 154 may be used to compress seals 156 and improve the pressure resistance of the connection between these components along interface 160. Pressure release port 270 is provided to permit pressure to be safely released or slowly bled-off during operations if desired. In general, pressure housing 104 may be configured as desired provided the configuration permits interior placement of the line reel and adequately withstands pressure. Pressure housing configurations other than a body housing and two end pieces are contemplated and included within the scope of the present invention. For example, the pressure housing may be provided in two halves, or more than one interconnected body housings.

Control device 280 shown as a brake in FIG. 3A is used to permit or prevent rotation of line reel assembly 100, thereby permitting or preventing line 200 from being deployed into coiled tubing 15. Although control device 280 is shown in FIG. 3A as a brake, other types of holding devices useful to permit or prevent rotation of line reel 108 about shaft 112 as desired including but not limited to clamps, pins, and blocks are contemplated within the scope of the present invention. In another embodiment, line reel assembly 100 may be configured such that line reel 108 does not rotate unless control device 280 is engaged. In this embodiment, control device 280 may be a driving apparatus such as a motor. Alternatively control device 280 may comprise a combination of holding and driving devices, such as in a combination of a motor and brake. Control device 280 may be activated and deactivated in a variety of ways such as mechanically, electrically, or hydraulically as would be known to a person of ordinary skill in the art. Although control device 280 is shown disposed exterior to line reel assembly 100, it equally may be placed within pressure housing 104 and control lines disposed within shaft 112.

Line 200 is provided spooled about line reel 108 (see FIG. 3B). A leading end of line 200 is shown in FIG. 3B disposed within line payout guide 210, the payout guide being interior to line deployment tube 180. Fluid inlet port 230 is shown in fluid communication with line payout guide 210. When control device 280 is not engaged such that line reel 108 may rotate, fluid flow into fluid inlet port 230 propels line 200 along line payout guide 210, thus unspooling additional line 200 from line reel 108. The leading edge of line 200 flows along with fluid into velocity tube 240 shown disposed in extension tube 260. Extension tube 260 is coupled to connector 250 to permit connection to the non-working end 140 of the coiled tubing 15.

The length of extension tube 260 and velocity tube 240 therein may be provided in a variety of lengths. The length of the extension tube may be adjusted such that sufficient fluid flow force provided along the length of unspooled line to propel line 200 into the non-working end 140 of the coiled tubing spooled on a reel. The desired length of velocity tube 240 housed in extension tube 260 may be determined based on a variety of factors including line characteristics such as weight and diameter, flow rates, and fluid characteristics such as density and viscosity.

In use, coiled tubing reel assembly 5 having coiled tubing reel 10 and line reel assembly 100 are provided. When it is desired to deploy and use coiled tubing 15 in known methods, line deployment tube 180 is not connected to coiled tubing end 140, control device 280 is preferably engaged to maintain line reel 108 in a static position, and coiled tubing 15 may be used, run-in-hole, or pulled-out-of-hole as known in the art. When it is desired to deploy a line in the coiled tubing during operations, line deployment tube 180 may be connected to coiled tubing end 140 and control device 280 is released and engaged as desired. Alternatively, line deployment tube 108 is connected to coiled tubing end 140 but control device 280 is positioned initially to prevent line 200 on line reel 108 from unspooling and then later as desired control device 280 re-positioned to permit line 100 on line reel 108 to unspool.

Line 200 may be deployed in coiled tubing 15 while coiled tubing 15 is spooled on the reel or while coiled tubing 15 is being deployed in a wellbore. Thus, the present invention allows the operationally flexibility to pre-deploy line 200 in spooled coiled tubing 15 when before providing it to a well site, pre-deploy line 200 in spooled coiled tubing 15 after providing it to the wellsite but before deploying coiled tubing 15 in the borehole, or deploy line 200 in coiled tubing 15 as the coiled tubing is being deployed into the wellbore at the well site location, or a combination of these.

One embodiment of a method to install line 200 in spooled coiled tubing 15 is as follows. Line reel 108 whereupon line 200 is spooled is placed on shaft 112 in pressure housing 104 and the leading end of line 200 placed in line deployment tube 108 to extend at least past fluid inlet port 230 and in preferred embodiments into velocity tube 240. Line deployment tube 180 is connected to the non-service end 140 of the coiled tubing while coiled tubing 15 is disposed on reel 10. Fluid is provided to coiled tubing reel assembly 5 through hydraulic connections to a fluid pumping system: such hydraulic connections and pumping systems are well known in the art. Fluid is then pumped into the spooled coiled tubing 15. As fluid flows past coiled tubing end 140 a stream of fluid diverts into line payout guide 210 via fluid inlet port 230. The leading end of line 200 will be propelled by the fluid flow in velocity tube 240 through connector 250 into coiled tubing 15. As fluid flows in to the spooled coiled tubing, it propels the line throughout the length of the spooled coiled tubing 15. The term fluid as used herein encompasses gases such as nitrogen and air as well as liquids including but not limited to water, seawater, brine, polymer viscosified water, drilling fluids, stimulation fluids, hydrocarbons, and aqueous liquids. In the situation where the line 200 is deployed in spooled coiled tubing 15 prior to deployment to the well site, water or pressurized air are preferred fluids as the fluid discharge from the service end of the coiled tubing 15 may not flow into a wellbore. In the situation where the line 200 is deployed in spooled coiled tubing 15 after deployment to the well site but before deploying coiled tubing 15 into the wellbore, the present invention provides the flexibility to deploy the line as desired before connecting to injector system 20 (i.e. not under well pressure) or after connecting to injector system 20 (i.e. under well pressure).

One embodiment of a method to install line 200 in coiled tubing 15 as the coiled tubing is being deployed in to a wellbore is as follows. Line reel 108 whereupon line 200 is spooled is placed on shaft 112 in pressure housing 104 and the leading end of line 200 placed in line deployment tube 108 to extend at least past fluid inlet port 230 and in preferred embodiments into velocity tube 240. Line deployment tube 180 is connected to the non-service end 140 of the coiled tubing while coiled tubing 15.

Coiled tubing 15 is provided to wellbore 8 via injector system 20 and pressurized to well pressure as well known to those skilled in the art. As line reel assembly 100 is hermitically connected to coiled tubing 15 as it is brought to well pressure, line reel assembly 100 is likewise pressurized to well pressure. In this manner, the present invention permits installation of a line in coiled tubing under pressured conditions. As such, it provides distinct advantages over the prior art by eliminating differential pressure between cable and coiled tubing, thereby avoiding the need for a cable seal, eliminating the friction imposed on a cable by such a seal as well eliminating the ejection forces owing to differential pressure known to act on the wireline cable.

Fluid is provided to coiled tubing reel assembly 5 through hydraulic connections to a fluid pumping system: such hydraulic connections and pumping systems are well known in the art. As fluid flows past coiled tubing end 140 a stream of fluid diverts into line payout guide 210 via fluid inlet port 230. The leading end of line 200 will be propelled by the fluid flow in velocity tube 240 through connector 250 into coiled tubing 15. As the leading end of line 200 is propelled away from line reel assembly 100 by the fluid flow, line 200 unspools from line reel 208. In the event that the coiled tubing is being unspooled as line 200 is being deployed in coiled tubing 15, it is preferred that the rate of unspooling of line 200 exceed the rate of unspooling of coiled tubing 15, thereby providing a differential rate of spooling to ensure that line 200 propelled throughout the length of coiled tubing 15. The rate at which line 200 unspools relates to the rate at which the leading end of line 200 is propelled away from line reel 208 by fluid flow in velocity tube 240. Adjusting velocity tube 240 permits adjustments to the rate at which line 200 may unspool. In some embodiments particularly applicable to this method of deployment, control device 280 is a motor useable to rotatably drive shaft 112 unspool line 200 from line reel 108 at a specified rate. As fluid flows in to the spooled coiled tubing, it propels the line throughout the length of the spooled coiled tubing 15.

The term "line" as used herein encompasses any fiber, thread, rope, cord, cable, tube, slickline, duct, or other similar continuous (or interconnected to be continuous) device having a relatively small diameter in comparison to its length, that has the flexibility to be spooled on a reel, is of small enough diameter to be placed within coiled tubing and that is suitable for use in a downhole environment. In particular embodiments, optical fiber is provided as line 200. It is contemplated within the scope of the present invention to use as desired any ones of a variety of optical fibers including but not limited to single-mode fiber; multi-mode fiber; bare fiber; polymer coated fiber; jacketed fiber; fiber enclosed in a tube or conduit such that the fiber and tube or conduit are spooled or unspooled as a single object. Advantages of using optical fibers, such as passive operation, small diameter, light weight, continuous use, real time transmission, and as well as the ability to be adapted to sense and transmit data, are realized in the present invention when line 200 comprises one or more optical fibers.

In other embodiments, the present invention is applicable and useful for deploying and leaving a line 200 in a wellbore using coiled tubing. In these embodiments, line 200 is deployed in coiled tubing 15 through any of the methods contemplated herein. When coiled tubing 15 with line 200 disposed therein reaches the desired depth in the wellbore, fluid flow is continued through coiled tubing 200 while the coiled tubing is being pulled out of hole. The friction provided by the continued fluid flow on line 200 effectively holds line 200 at location at depth in the wellbore while coiled tubing 15 is extracted from the borehole and re-spooled on coiled tubing reel 10. This method of deploying a line in a borehole is particularly advantageous when the line comprises optical fibers. As the line is held in place by continued fluid flow, it does not present a risk of damaging the optical fiber line as would a mechanical method. In further embodiments, line 200 may be deployed to a desired depth with a sub, sensor, or measuring device deployed therein. In one embodiment, line 200 and the sub, sensor, or measuring device remain in the borehole and coiled tubing 15 pulled out of hole.

While various examples of methods of deploying a line in coiled tubing have been presented, the scope of this invention is not limited by the examples but rather a variety of methods or combinations of methods are contemplated. For example, it may be advantageous to first deploy coiled tubing 15 to a target depth, perform an operation, and then install line 200. This may be accomplished by positioning control device 280 to initially prevent unspooling of line 200 and then positioning control device 280 to permit unspooling of line 200 once the operation has been performed.

Operations that may be performed using line 200 comprising fiber optics deployed using coiled tubing include but are not limited to transmitting control signals from the surface equipment to the downhole equipment over the fiber optic line, transmitting information gathered from at least one downhole sensor to the surface equipment over the fiber optic line, or collecting information by measuring an optical property observed on the fiber optic line. The downhole tools or sensors connected to the fiber optic line may either include devices that manipulate or respond to optical signal directly, e.g., temperature sensors wherein the temperature produces an optical effect, or tools or sensors that produce an electrical signal in response to a measured property used in association with an electrical-to-optical interface for converting electrical measurements into optical signals for transmission from the downhole tools or sensors to optical signals that are transmitted on the fiber optic line to the surface.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

The invention claimed is:

1. A method of placing a line in coiled tubing at least partially spooled on a coiled tubing reel, comprising
   providing a pressure housing adapted to rotate along with the coiled tubing reel;
   providing a line disposed on a reel in the pressure housing;
   exposing the coiled tubing to well pressure while at least partially spooled on the coiled tubing reel; and
   deploying, under well pressure, the line within the coiled tubing using fluid flow while the coiled tubing is at least partially spooled on the coiled tubing reel.

2. The method as claimed in claim 1, further comprising the step of deploying the coiled tubing into a wellbore as the line is being deployed within the coiled tubing.

3. The method as claimed in claim 1, wherein the line comprises fiber optics.

4. The method as claimed in claim 1, further comprising mounting the pressure housing on the coiled tubing reel.

5. A method of placing a line in coiled tubing at least partially spooled on a coiled tubing reel, comprising
   providing a line spooled on a reel in a pressure housing;
   mounting the pressure housing on the coiled tubing reel such that it rotates along with rotation of the coiled tubing reel;
   providing a control device operable to selectively permit or prevent the line from unspooling;
   exposing the pressure housing to well pressure; and
   contacting the line with fluid flow to move the line while exposed to well pressure.

6. The method as claimed in claim 5, wherein the control device is operated to permit the line to unspool;, and
   further comprising the step of deploying the line within the coiled tubing using fluid flow.

7. The method as claimed in claim 6, wherein the control device is a brake.

8. The method as claimed in claim 6, where the control device is a motor.

9. The method as claimed in claim 5, wherein the line comprises fiber optics.

10. A method for placing a line into a wellbore comprising the steps of
deploying coiled tubing into a wellbore from a coiled tubing reel;
pumping a fluid into the coiled tubing;
injecting a line into the coiled tubing, wherein the line is disposed on a reel provided in a pressure housing adapted to rotate along with the coiled tubing reel; and
using the pumped fluid to convey the line along the coiled tubing while the coiled tubing is at least partially spooled on the coiled tubing reel.

11. The method as claimed in claim 10, further comprising removing the coiled tubing from the wellbore.

12. The method as claimed in claim 11 further comprising continuing to pump the fluid while removing the coiled tubing from the wellbore.

13. The method as claimed in claim 10 further comprising the step of leaving the line in the wellbore.

14. The method as claimed in claim 10 where the line comprises optical fiber.

15. The method as claimed in claim 10 further comprises providing a measurement device on the line.

16. A method for placing a line into a wellbore comprising mounting a pressure chamber on a coiled tubing reel such that it can rotate along with the coiled tubing reel;
deploying a line disposed in the pressure chamber into a coiled tubing while the coiled tubing is spooled on the coiled tubing reel; and
deploying the coiled tubing and line into the wellbore.

17. The method as claimed in claim 16, wherein the method is performed under pressure.

18. An apparatus for deploying a line in a coiled tubing at least partially spooled on a coiled tubing reel, comprising:
a line reel disposed in a pressure housing, the pressure housing adapted to rotate along with the coiled tubing reel;
a line deployment tube; and
fluid flow within the line deployment tube, wherein the fluid flow in the line deployment tube is in hydraulic communication with the fluid flow in the coiled tubing.

19. The apparatus as claimed in claim 18, further comprising a connector.

20. The apparatus as claimed in claim 18, wherein the line reel is disposed on a shaft; and
further comprising a control device operable to selectively permit or prevent rotation of the line reel on the shaft.

21. The method as claimed in claim 20, wherein the control device is a brake.

22. The method as claimed in claim 20, where the control device is a motor.

23. The apparatus of claim 18, wherein the pressure housing is mounted to the coiled tubing reel.

24. A method for placing fiber optics into a wellbore comprising the steps of
deploying coiled tubing into a wellbore;
pumping a fluid into the coiled tubing;
injecting a fiber optic line into the coiled tubing while the coiled tubing is at least partially spooled on a coiled tubing reel, wherein the fiber optic line is disposed on a reel provided in a pressure housing adapted to rotate along with the coiled tubing reel; and
using the pumped fluid to convey the line along the coiled tubing.

25. The method as claimed in claim 24, further comprising removing the coiled tubing from the wellbore.

26. The method as claimed in claim 24 further comprising continuing to pump the fluid while removing the coiled tubing from the wellbore.

27. The method as claimed in claim 24 further comprising the step of leaving the fiber optic line in the wellbore.

* * * * *